United States Patent
Lee et al.

(10) Patent No.: US 11,637,717 B2
(45) Date of Patent: *Apr. 25, 2023

(54) COMMAND INPUT DEVICE AND CONTROLLING METHOD THEREOF

(71) Applicant: LG Electronics Inc., Seoul (KR)

(72) Inventors: Seonghun Lee, Seoul (KR); Hwanyong Kim, Seoul (KR); Sooyong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/471,711

(22) Filed: Sep. 10, 2021

(65) Prior Publication Data

US 2021/0409237 A1 Dec. 30, 2021

Related U.S. Application Data

(63) Continuation of application No. 16/169,360, filed on Oct. 24, 2018, now Pat. No. 11,171,801.

(30) Foreign Application Priority Data

Oct. 24, 2017 (KR) .......................... 10-2017-0138227

(51) Int. Cl.
*H04L 12/28* (2006.01)
*G08C 17/04* (2006.01)
(Continued)

(52) U.S. Cl.
CPC ............ *H04L 12/282* (2013.01); *G08C 17/02* (2013.01); *G08C 17/04* (2013.01);
(Continued)

(58) Field of Classification Search
None
See application file for complete search history.

(56) References Cited

U.S. PATENT DOCUMENTS

| 5,990,803 | A | * | 11/1999 | Park | H04N 7/163 |
|---|---|---|---|---|---|
| | | | | | 348/E5.103 |
| 6,597,292 | B1 | | 7/2003 | Shigyo | |

(Continued)

FOREIGN PATENT DOCUMENTS

| JP | H03060598 | 3/1991 |
|---|---|---|
| KR | 1020060035236 | 4/2006 |

(Continued)

OTHER PUBLICATIONS

Hwang et al., "Home Network Configuring Scheme for All Electric Appliances Using Zig Bee-based Integrated Remote Controller," IEEE Transactions on Consumer Electronics, dated Jul. 14, 2009, 55(3):1300-1308.

(Continued)

*Primary Examiner* — Mohammad Ali
*Assistant Examiner* — Kelvin Booker
(74) *Attorney, Agent, or Firm* — Fish & Richardson P.C.

(57) ABSTRACT

Disclosed is a method for controlling a command input device. The method includes: sensing contact between a home appliance and the command input device; based on sensing the contact between the home appliance and the command input device, determining the home appliance as a target home appliance to be controlled by the command input device; and based on the determination of the home appliance as the target home appliance to be controlled by the command input device, activating a remote controller provided by the command input device and configured to control the target home appliance.

16 Claims, 13 Drawing Sheets

(51) Int. Cl.
*G08C 17/02* (2006.01)
*H04M 1/72* (2021.01)
*H04M 1/72415* (2021.01)
*H04M 1/72412* (2021.01)

(52) U.S. Cl.
CPC .... *H04M 1/72415* (2021.01); *G08C 2201/92* (2013.01); *G08C 2201/93* (2013.01); *H04M 1/72412* (2021.01)

(56) References Cited

U.S. PATENT DOCUMENTS

| | | | |
|---|---|---|---|
| 6,650,247 B1* | 11/2003 | Hayes | H04B 10/1141 340/12.23 |
| 6,788,241 B2* | 9/2004 | Arling | G08C 17/00 725/38 |
| 6,850,149 B2* | 2/2005 | Park | G08B 13/1418 340/12.4 |
| 8,508,401 B1* | 8/2013 | Patel | H04L 12/282 341/176 |
| 9,398,242 B2* | 7/2016 | Kohanek | H04N 21/42225 |
| 9,812,006 B1 | 11/2017 | Mi | |
| 9,953,519 B2* | 4/2018 | Kohanek | H04N 21/42227 |
| 10,161,072 B2 | 12/2018 | Kim et al. | |
| 2002/0077143 A1 | 6/2002 | Sharif et al. | |
| 2002/0180581 A1 | 12/2002 | Kamiwada et al. | |
| 2003/0164787 A1* | 9/2003 | Dresti | G08C 17/00 348/E5.127 |
| 2004/0092282 A1 | 5/2004 | Kim et al. | |
| 2004/0148632 A1 | 7/2004 | Park et al. | |
| 2004/0169590 A1* | 9/2004 | Haughawout | G08C 19/28 348/E5.127 |
| 2004/0210933 A1* | 10/2004 | Dresti | H04N 21/4821 725/39 |
| 2004/0249925 A1 | 12/2004 | Jeon et al. | |
| 2005/0162282 A1* | 7/2005 | Dresti | H04N 21/42221 340/12.3 |
| 2006/0282551 A1 | 12/2006 | Steinberg et al. | |
| 2006/0282572 A1 | 12/2006 | Steinberg et al. | |
| 2007/0021152 A1 | 1/2007 | Jung | |
| 2007/0099679 A1 | 5/2007 | Saarisalo | |
| 2007/0165555 A1 | 7/2007 | Deng et al. | |
| 2007/0293208 A1 | 12/2007 | Loh et al. | |
| 2008/0068207 A1 | 3/2008 | Elberbaum | |
| 2008/0244144 A1 | 10/2008 | Choi | |
| 2008/0272929 A1 | 11/2008 | Nakamura | |
| 2010/0123613 A1* | 5/2010 | Kohanek | G08C 19/28 340/12.23 |
| 2010/0227642 A1 | 9/2010 | Kim et al. | |
| 2011/0312278 A1 | 12/2011 | Matsushita et al. | |
| 2012/0289291 A1 | 11/2012 | Moran et al. | |
| 2013/0005250 A1 | 1/2013 | Kim et al. | |
| 2013/0249677 A1* | 9/2013 | Kohanek | G08C 17/02 340/12.5 |
| 2014/0062680 A1* | 3/2014 | Chen | G08C 17/00 340/12.32 |
| 2014/0148147 A1* | 5/2014 | Tak | H04M 1/72415 455/420 |
| 2014/0153491 A1 | 6/2014 | Lee et al. | |
| 2014/0340203 A1 | 11/2014 | Chen et al. | |
| 2014/0361739 A1 | 12/2014 | Kwak et al. | |
| 2015/0048931 A1* | 2/2015 | Kohanek | G08C 19/28 340/12.5 |
| 2015/0130409 A1 | 5/2015 | Lee et al. | |
| 2016/0215430 A1 | 6/2016 | Ha et al. | |
| 2017/0026195 A1 | 1/2017 | Pan | |
| 2017/0272316 A1 | 9/2017 | Johnson et al. | |
| 2017/0279632 A1 | 9/2017 | Kober et al. | |
| 2017/0353054 A1 | 12/2017 | Lee | |
| 2018/0309786 A1 | 10/2018 | Apelewicz et al. | |
| 2018/0337702 A1* | 11/2018 | Hayes | H04B 1/202 |
| 2021/0091601 A1 | 3/2021 | Kim et al. | |

FOREIGN PATENT DOCUMENTS

| | | |
|---|---|---|
| KR | 1020100033606 | 3/2010 |
| KR | 1020150017581 | 2/2015 |
| KR | 1020150033984 | 4/2015 |
| KR | 1020160002000 | 1/2016 |
| KR | 1020160035382 | 3/2016 |
| KR | 1020160067706 | 6/2016 |

OTHER PUBLICATIONS

International Search Report in International Appln. No. PCT/KR2018/012621, dated Feb. 7, 2019, 3 pages (with English translation).

Pavithra et al., "IoT based Monitoring and Control System for Home Automation," Proceedings of 2015 Global Conference on Communication Technologies, dated Apr. 2015, 5 pages.

Wang et al., "An IoT-based Appliance Control System for Smart Homes," 2013 Fourth International Conference on Intelligent Control and Information Processing, Beijing, China, dated Jun. 9-11, 2013, 4 pages.

\* cited by examiner

COMMAND INPUT DEVICE AND CONTROLLING METHOD THEREOF

CROSS-REFERENCE TO RELATED APPLICATION

This application is a continuation of U.S. Application No. 16/169,360, filed on Oct. 24, 2018, which claims the priority benefit of Korean Patent Application No. 10-2017-0138227, filed on Oct. 24, 2017, in the Korean Intellectual Property Office, the disclosures of which are incorporated herein by reference.

FIELD

The present disclosure relates to a command input device and a controlling method thereof.

BACKGROUND

Home automation systems may be used inside and outside of studio apartments, commercial buildings, office buildings, apartment complexes, and the like to provide convenience and security for users and to prevent intruders from trespassing their properties.

In some examples, home appliances may include a controller, which is used to input a user's command and to display an operation state of home appliances. For example, each home appliance may be provided with a separate remote controller in order to control the home appliance, which may cause inconvenience to users.

In some cases, a single remote controller may be provided to control a plurality of home appliances. In some cases, confusion may occur when the remote controller fails to determine a home appliance to be controlled, or when a remote object corresponding to each home appliance may not be activated. It is of interest to perform fine control of each home appliance with a single remote controller.

SUMMARY

One object of the present disclosure is to provide a command input device and a controlling method of the same, in which when the command input device comes into contact with a home appliance, a plurality of home appliances may be controlled using one device by activating a remote controller corresponding to the home appliance.

Another object of the present disclosure is to provide a command input device and a controlling method of the same, in which when the command input device comes into contact with a home appliance, the command input device operates by receiving power from the home appliance, and when the contact therebetween is released, the command input device is changed to a standby mode, thereby reducing energy consumption.

Another object of the present disclosure is to provide a command input device and a controlling method of the same, in which the command input device is detachably connected to home appliances. In this case, each home appliance may not include a physical button or a display to input a command to the home appliance, which improves an appearance of the home appliance.

The above objects of the present disclosure are not limited to the aforesaid, and other objects not described herein will be clearly understood by those skilled in the art from the following description.

According to one aspect of the subject matter described in this application, a method for controlling a command input device includes: sensing contact between a home appliance and the command input device; based on sensing the contact between the home appliance and the command input device, determining the home appliance as a target home appliance to be controlled by the command input device; and based on the determination of the home appliance as the target home appliance to be controlled by the command input device, activating a remote controller provided by the command input device and configured to control the target home appliance.

Implementations according to this aspect may include one or more of the following features. For example, activating the remote controller includes outputting, to a display of the command input device, an object that represents the remote controller for controlling the target home appliance. In some examples, the command input device is configured to connect to a mobile terminal through wireless communication, where activating the remote controller includes outputting, to the mobile terminal, a control signal for activating the remote controller.

In some implementations, activating the remote controller includes executing, by the command input device, a management application of the target home appliance. In some implementations, activating the remote controller includes: downloading, from a server to the command input device, a management application of the target home appliance; and executing the management application by the command input device. In some implementations, sensing the contact between the home appliance and the command input device includes sensing contact between a surface of a casing of the home appliance and the command input device.

In some implementations, the method further includes, based on sensing the contact between the home appliance and the command input device, transmitting power wirelessly from the target home appliance to the command input device. In some implementations, the method further includes: receiving a control command that is input from a user through the remote controller; and transmitting the control command to the target home appliance. In some implementations, the method further includes: determining whether the contact between the home appliance and the command input device is released; and based on a determination that the contact between the home appliance and the command input device is released, stopping transmission of power from the target home appliance to the command input device.

According to another aspect, a command input device includes: a contact sensing module configured to sense contact between a home appliance and the command input device; a communication module configured to transmit data to the home appliance and to receive data from the home appliance; a display configured to output an object representing a remote controller that is provided by the command input device and that is configured to control the target home appliance; an input module configured to receive, from a user, a control command for controlling the home appliance; and a controller configured to control operation of the command input device. The controller is further configured to: based on the contact sensing module sensing the contact between the home appliance and the command input device, determine the home appliance as a target home appliance to be controlled by the command input device; and based on the determination of the home appliance as the target home appliance to be controlled by the command input device, output, to the display, a control signal for activating the remote controller.

In some implementations, the command input device further includes: a housing configured to accommodate the display, the input module, and the communication module; and a magnetic body located in the housing and configured to generate attractive force to a casing of the home appliance. In some examples, the command input device further includes a power receiving module configured to receive power transmitted from the target home appliance. In some examples, the housing includes a position determiner configured to assist placement of the command input device at an alignment position of the target home appliance.

In some implementations, the input module includes: a dial connected to the housing and configured to rotate about a rotating shaft of the housing; and a rotation sensing module configured to sense a rotation direction of the dial. In some implementations, the input module includes a physical button exposed through a surface of the housing.

In some implementations, the controller is further configured to transmit, to the target home appliance, the control command that is input from the user through the input module. In some examples, the controller is further configured to, based on a release of the contact between the target home appliance and the command input device, output, to the display, a control signal for deactivating the remote controller. In some examples, the controller is further configured to, based on a release of the contact between the target home appliance and the command input device, turn off the display.

In some implementations, the controller is further configured to: based on the contact between the target home appliance and the command input device, output a first control signal for transmitting power from the home appliance to the command input device; and based on a release of the contact between the target home appliance and the command input device, output a second control signal for stopping transmission of power from the home appliance to the command input device. In some examples, the input module includes a touch screen located at the display and configured to receive touch input from the user.

These and other aspects and implementations are described more fully below in the detailed description, with reference to the accompanying drawings.

DETAILED DESCRIPTION

Figure 1:
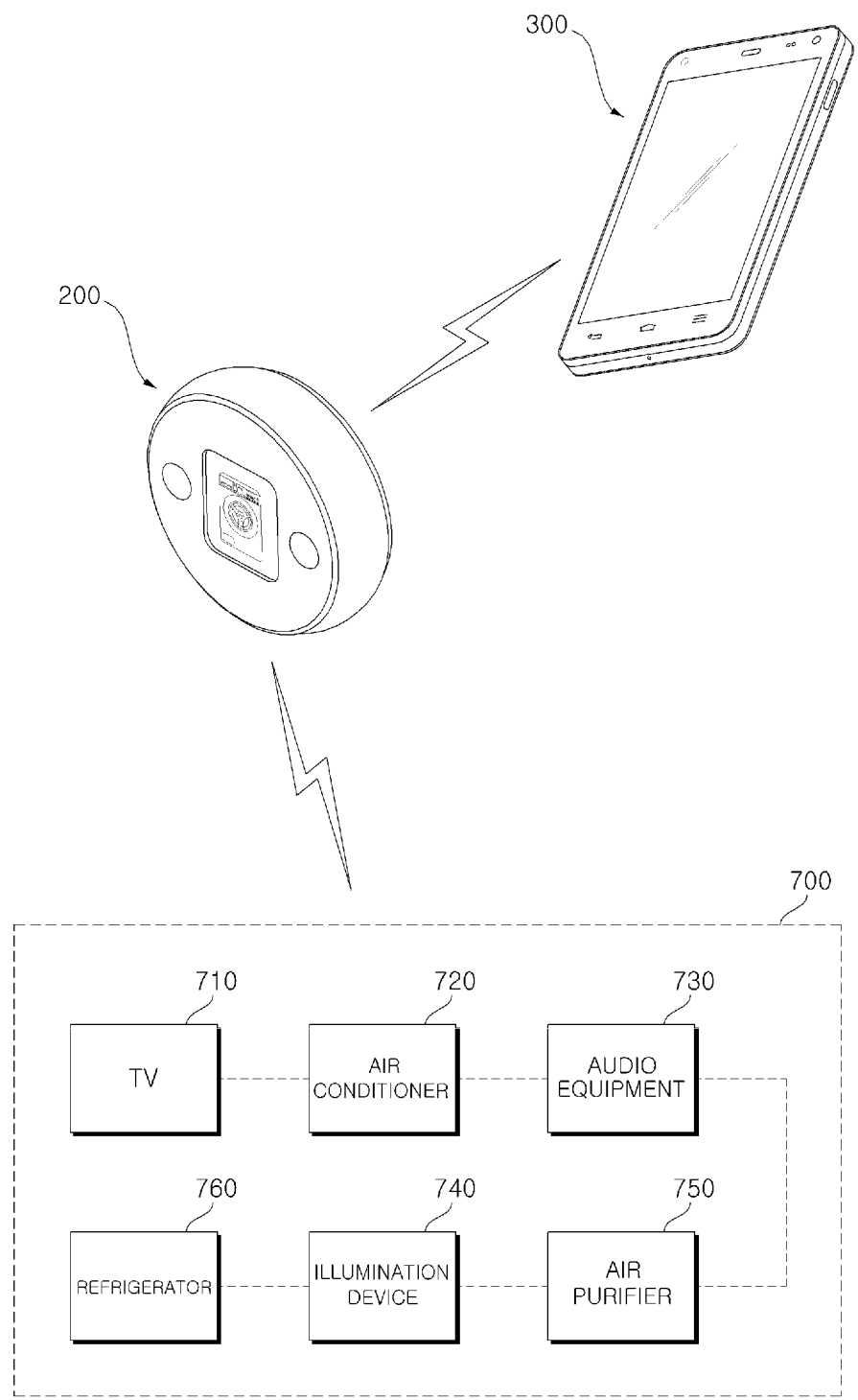
FIG. 1 is a conceptual diagram of an example home appliance system.

Advantages and features of the present disclosure and methods for achieving those of the present disclosure will become apparent upon referring to implementations described later in detail with reference to the attached drawings. However, implementations are not limited to the implementations disclosed hereinafter and may be implemented in different ways. The implementations are provided for perfection of disclosure and for informing persons skilled in this field of art of the scope of the present disclosure. The same reference numerals may refer to the same elements throughout the specification.

Hereinafter, exemplary implementations of the present disclosure will be described with reference to the accompanying drawings.

FIG. 1 is a conceptual diagram of an example home appliance system. Referring to FIG. 1, the home appliance system may include a plurality of home appliances 700, and a command input device 200 which, upon coming into contact with any one of the plurality of home appliances 700, may control the contacted home appliance 700. Also, the home appliance system including the home appliance 700 may further include a mobile terminal 300 which is connected through wireless communications to the command input device 200 and/or the home appliance 700.

The plurality of home appliances 700 include the home appliances 700 generally used at home. Examples of the home appliance 700 may include at least one of TV, an air conditioner, audio equipment, a refrigerator, an illumination device, an air purifier, and cooking equipment, but the home appliance 700 is not limited thereto, and may include various electronic devices.

The mobile terminal 300 may be a portable device which may communicate with, and may receive a user's command from, various electronic devices. However, the mobile terminal 300 is not limited thereto, and there is no limitation on the types of the mobile terminal 300 as long as the mobile terminal 300 may communicate with the command input device 200 and/or the home appliance 700, and may perform a controlling operation.

The command input device 200 is a device which may communicate with the mobile terminal 300 and/or the home appliance 700, may control the home appliance 700 by receiving a user's control command, and may display an operation state of the home appliance 700, and there is no limitation on the types of the command input device 200.

In order to perform fine control of a plurality of home appliances by using one command input device 200, when the command input device 200 senses contact with the home appliance 700, the command input device 200 determines the contacted home appliance 700 to be a home appliance to be controlled, and activates a remote controller corresponding to the home appliance to be controlled.

Hereinafter, the command input device 200 will be described in detail.

Figure 2:
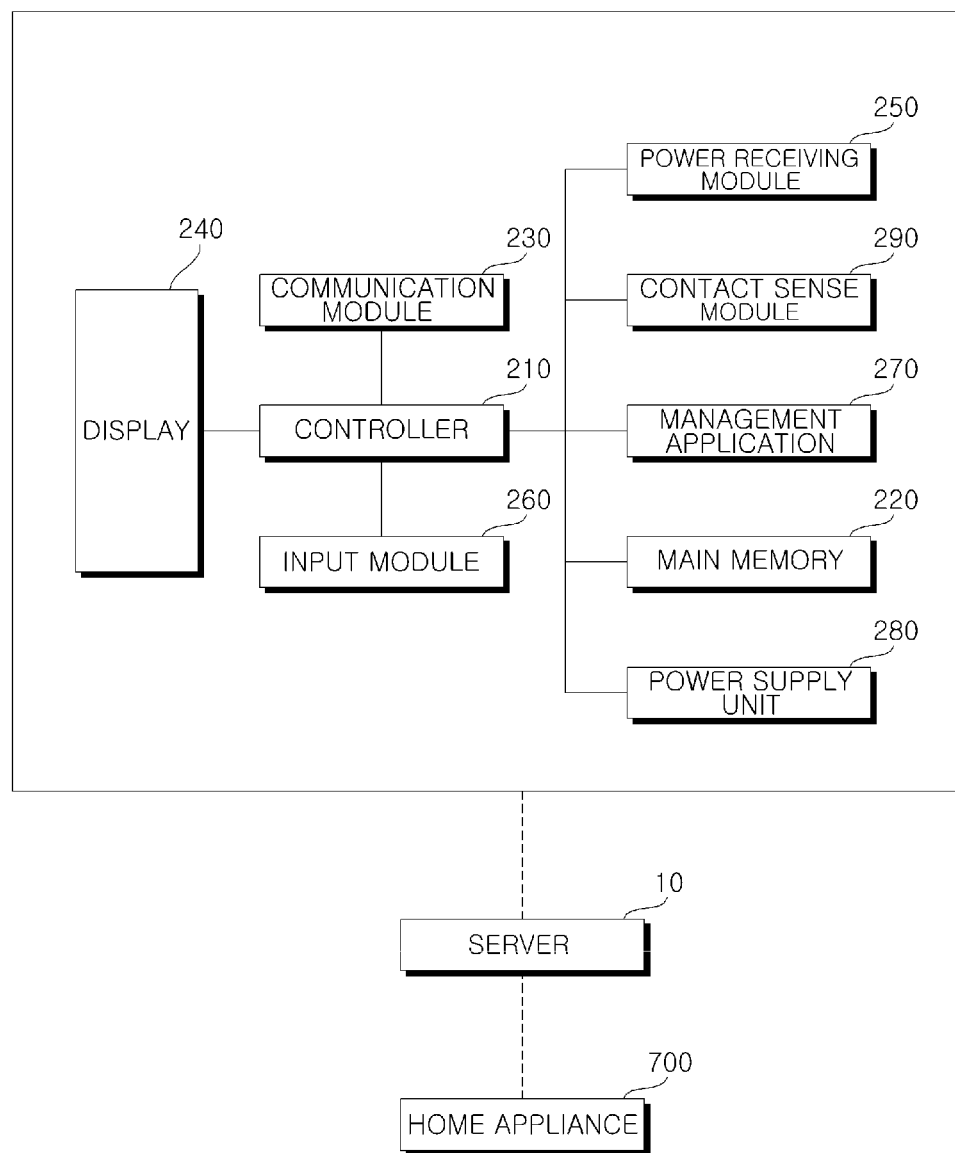
FIG. 2 is a block diagram illustrating an example home appliance system.

FIG. 2 is a block diagram illustrating an example home appliance system.

Referring to FIG. 2, in one implementation, the command input device 200 of the present disclosure includes: a communication module 230 which transmits and receives data with a home appliance to be controlled; a display 240 which outputs a remote object for controlling the home appliance to be controlled; an input module 260 for receiving a user's control command to control the home appliance to be controlled; a contact sensing module 290 which senses contact with the home appliance 700; and a controller 210 which controls the overall operation of the command input device 200. In addition, the command input device 200 may further include a power receiving module 250 and a power supply unit 280.

The communication module 230 may transmit and receive data between the home appliance to be controlled and the command input device 200. The communication module 230 transmits the received data to the controller 210, and transmits a control signal, received from the controller 210, to the home appliance 700 to be controlled.

The communication module 230 may perform communication by using not only wireless Internet communication technology such as Wireless LAN (WLAN) (Wi-Fi), Wireless broadband (Wibro), World Interoperability for Microwave Access (Wimax), High Speed Downlink Packet Access (HSDPA), WiFi, and the like, but also near-field communication technology such as Bluetooth, Radio Frequency Identification (RFID), Infrared Data Association (IrDA), Ultra Wideband (UWB), ZigBee, and the like, such that the communication technology is not limited to any one communication method. For example, the communication module 230 may use a power grid communication technology.

The display 240 is a device for outputting images which may be visually recognized by users.

The display 240 may display information, processed by the controller 210, in a visual manner so that a user may recognize the information.

For example, the display 240 may display control information for controlling the home appliance 700. The display 240 may display detected home appliances 700 and state information of the home appliance 700. A remote object 79 for controlling the home appliance 700 may be output on the display 240.

Depending on implementations, the display 240 may sense a touch input by having a touch panel for sensing touch inputs. In the case where the display 240 includes a touch panel, the display 240 may be used as an input module 260 having a touch screen in which a user may input a control command by touching the touch screen.

For example, the display 240 may include at least one of a liquid crystal display, a thin film transistor-liquid crystal display, an organic light-emitting diode, a flexible display, or a 3D display.

Specifically, a user interface (UI) screen is implemented by a management application 270 on the display 240 to display information of the home appliance 700 and control information of the home appliance 700. When the touch panel of the display 240 is used, the remote object 79 receives a control command input from a user's touch, and outputs the received control command to the controller 210.

The input module 260 receives input of a control command from a user. The input module 260 outputs the received control command to the controller 210. The input module 260 receives input of a user's control command for controlling the home appliance to be controlled, and outputs the received control command to the controller 210.

The input module 260 may include a mechanical input module (or a mechanical key, e.g., a dome switch, a jog wheel, a jog switch, etc.) and a touch-type input module. For example, the touch-type input module includes a virtual key, a soft key, or a visual key, which is displayed on a touch screen by software processing, or a touch key which is displayed on portions other than the touch screen. In this case, the virtual key or the visual key may be displayed on the touch screen in various forms including graphics, texts, icons, video, or a combination thereof.

The power supply unit 280 may supply power to the command input device 200, and may store power. For example, the power supply unit 280 may include a storage battery for storing electric energy.

In some implementations, the power supply unit 280 maintains the command input device 200 in a standby mode until power is supplied from the home appliance to be controlled, and uses a storage battery having power to allow the command input device 200 to transmit and receive an identification code with the home appliance to be controlled at an initial stage.

The power receiving module 250 may receive power transmitted from the home appliance to be controlled, and may supply the received power to the power supply unit 280 and/or the command input device 200. For example, the power receiving module 250 may be various devices which may receive power by a contact or contactless method or by a wired or a wireless method.

Figure 5:
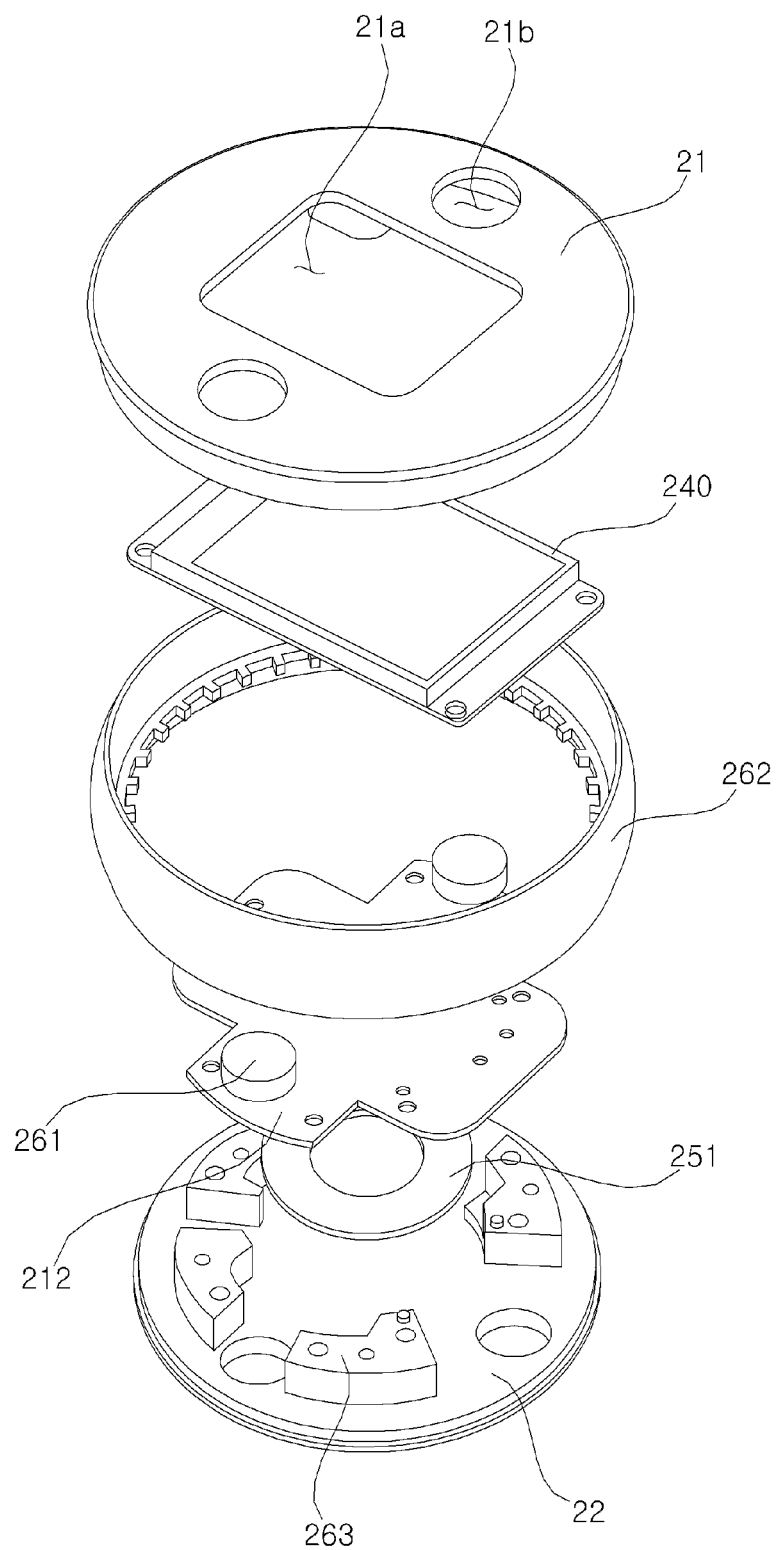
FIG. 5 is an exploded perspective view of the command input device illustrated in FIG. 3.
Figure 9:
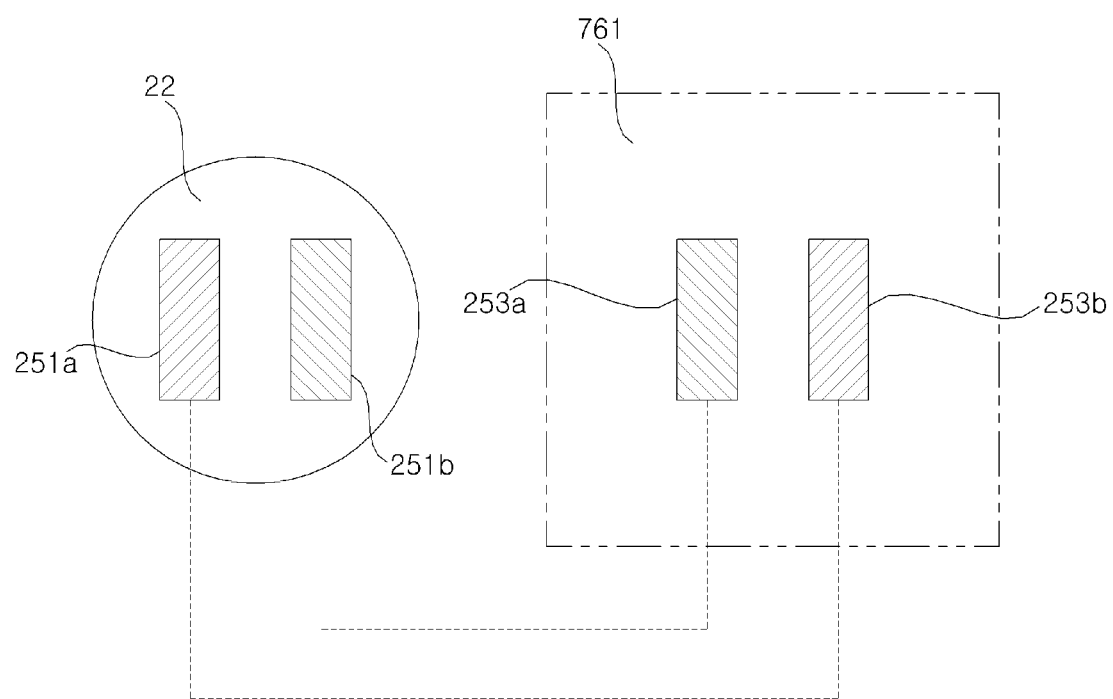
FIG. 9 is a conceptual diagram of an example home appliance system.
Figure 10:
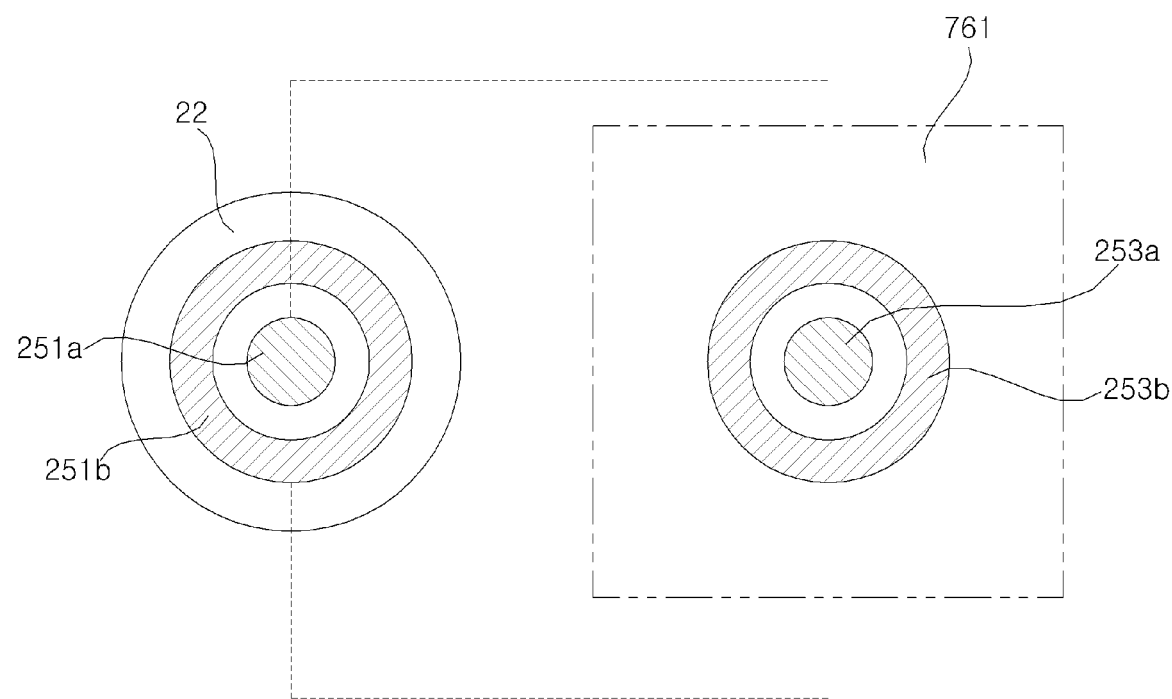
FIG. 10 is a conceptual diagram of another example home appliance system.

Specifically, as illustrated in FIG. 5, the power receiving module 250 may be a reception coil 251 which generates power by electromagnetic induction using a magnetic field generated by a transmission coil 253 of the home appliance 700; or as illustrated in FIG. 9 or FIG. 10, the power receiving module 250 may include receiving electrodes 251a and 251b which come into contact with an exposed electrode of the home appliance 700.

The power receiving module 250 may be of an electromagnetic induction type and a magnetic resonance type. The electromagnetic induction refers to the generation of an electric current through induction of a voltage when a magnetic field is changed around a conductor in which electricity flows. By using the principle of electromagnetic induction, a power source unit may be charged, which is a driving source for operating a driving power unit of an electronic device.

The magnetic resonance uses a combination of strong magnetic fields formed between magnetic resonators having the same resonant frequency, in which by using a resonance phenomenon that resonates with a great amplitude at a specific frequency, an electric current is generated by connecting one of two coils to a wireless charging transmitter and connecting the other to an electronic device, to tune to the same frequency.

The electromagnetic induction has a high charging efficiency of 90% compared to a wired charging method, but has a drawback in that the wireless charging transmitter and the wireless charging receive should be close to each other within a distance range of 1 cm to 2 cm. By contrast, the magnetic resonance allows for long-distance charging, but has a low charging efficiency of 70% compared to a wired charging method. The wireless charging system of the present disclosure may be applied regardless of the types of wireless charging principles. For example, the wireless charging system may utilize magnetic resonance.

By providing the power receiving module 250, there are effects in that: the size of the power supply unit 280 of the command input device 200 may be reduced; there is no need to separately charge the command input device 200; and production costs of the command input device 200 may be reduced.

The contact sensing module 290 senses contact between the home appliance 700 and the command input device 200. In this case, the contact between the home appliance 700 and the command input device 200 refers to not only a case where the home appliance 700 and the command input device 200 are in full contact with each other, but also a case where the home appliance 700 and the command input device 200 are located within a close distance (approximately less than 1 mm).

The contact sensing module 290 may sense contact between one surface of a casing 761 of the home appliance 700 and housings 21 and 22 of the command input device 200; or may sense that the one surface of the casing 761 of the home appliance 700 and the housings 21 and 22 of the command input device 200 approach each other to within a close distance.

The contact sensing module 290 senses the contact between the home appliance 700 and the command input device 200, and provides information on the contact to the controller 210.

For example, the contact sensing module 290 may sense the contact between the home appliance 700 and the command input device 200: by measuring a distance between an outer surface of the command input device 200 and one surface of the home appliance 700; by measuring pressure applied to the outer surface of the command input device 200 or the one surface of the home appliance 700; or by measuring an electric current applied between the outer surface of the command input device 200 or the one surface of the home appliance 700.

For example, the contact sensing module 290 may include at least one of a pressure sensor, a proximity sensor, an illumination sensor, a touch sensor, an infrared sensor, an ultrasonic sensor, or an optical sensor.

The contact sensing module 290 may be provided on an outer surface of the command input device 200 or the home appliance 700.

A main memory 220 may include a high-speed random access memory. The main memory 220 may include one or more of a magnetic disk storage device, a flash memory device, or other non-volatile memory, such as non-volatile virtual memory device, but is not limited thereto, and may include a readable storage medium.

For example, the main memory 220 may include Electronically Erasable and Programmable Read Only Memory (EEP-ROM), but is not limited thereto. During operation of the controller 210, information may be entered into or erased from the EEP-ROM by the controller 210. The EEP-ROM may be a memory device, in which even when the control device is powered off, and thus power supply is stopped, information recorded therein is not erased but is maintained.

The main memory 220 may be connected to the controller 210, to store various programs, data, and the like. The main memory 220 may store programs required for the controller 210 to control the home appliance 700. The controller 210 may detect or control the home appliance 700 based on the programs stored in the main memory 220.

The main memory 220 may store operation information on methods of operating the home appliance 700. Further, the main memory 220 may store history information on previous methods of controlling the home appliance 700 based on the control command of the input module 260. In addition, the main memory 220 may store passwords for security.

A user may control the home appliance 700 by executing a management application 270 stored in the main memory 220 of the command input device 200. After access to the Internet using the command input device 200, the user may download and install the management application 270, and may control the home appliance 700 by executing the management application 270.

The controller 210 may control the overall operation of the command input device 200 or the home appliance 700. As illustrated in FIG. 2, the controller 210 may be included in the command input device 200, but may also be included in the home appliance 700 or a server. The controller 210 may include a microprocessor.

The controller 210 may identify a type and an operation state of the home appliance 700 based on data of the home appliance transmitted from the communication module 230. The controller 210 may sense contact between the home appliance 700 and the command input device 200 based on sensing results obtained by the contact sensing module 290, may determine the contacted home appliance 700 to be a home appliance to be controlled, and may activate a remote controller corresponding to the determined home appliance to be controlled.

Based on the sensing results obtained by the contact sensing module 290, the controller 210 determines that the home appliance 700 is in contact with the command input device 200. Specifically, based on pressure measured by a pressure sensor, in the case where one surface of the home appliance 700 and one surface of the command input device 200 approach each other to within a close distance, or in the case where the home appliance 700 and the command input device 200 are electrically connected to each other, the controller 210 determines that the home appliance 700 and the command input device 200 are in contact with each other. The controller 210 maintains the command input device 200 in a standby mode or a sleep mode until the command input device 200 comes into contact with the home appliance 700.

The controller 210 may determine the contacted home appliance 700 to be a home appliance to be controlled. Specifically, upon sensing that the command input device 200 comes into contact with the home appliance 700, the controller 210 may control the home appliance 700, which is in contact with the command input device 200, to transmit an identification code, and may control the command input device 200, which is in contact with the home appliance 700, to receive the identification code. By contrast, upon sensing that the command input device 200 comes into contact with the home appliance 700, the controller 210 may control the command input device 200, which is in contact with the home appliance 700, to transmit an identification code, and may control the home appliance 700, which is in contact with the command input device 200, to receive the identification code. Upon determining that the home appliance 700 and the command input device 200 are in contact with each other, the controller 210 may determine a home appliance to be controlled by controlling either one of the contacted home appliance 700 or the contact command input device 200 to transmit an identification code, and by controlling either one of the contacted home appliance 700 or the contact command input device 200 to receive the identification code. The home appliance 700 and the command input device 200, which transmit and receive the identification codes, are paired by the controller 210. The home appliance 700, which is paired with the command input device 200, will be referred to as a home appliance to be controlled.

Upon determining that the home appliance to be controlled comes into contact with the command input device 200, the controller 210 outputs a control signal to transmit power from the home appliance 700 to the command input device 200. The controller 210 may operate a power transmission module of the home appliance 700 to transmit power to the command input device 200.

Upon determining that the home appliance to be controlled comes into contact with the command input device 200, the controller 210 activates a remote controller, corresponding to the home appliance to be controlled, in the command input device 200. Alternatively, upon determining that the home appliance to be controlled comes into contact with the command input device 200, the controller 210 may operate a power transmission module of the home appliance 700, and then may activate a remote controller, corresponding to the home appliance to be controlled, in the command input device 200.

Here, activation of the remote controller in the command input device 200 means that the command input device 200 may receive a control command for the home appliance 700. Specifically, the controller 210 outputs a control signal for outputting a remote object which controls the home appliance to be controlled that is paired with the command input device 200.

Alternatively, the controller 210 outputs a control signal for activating an input module 260 which controls the home appliance to be controlled that is paired with the command input device 200.

Here, the remote controller corresponding to the home appliance 700 may be a remote controller, which may control the home appliance to be controlled in an optimal state, by considering a type and a current state of the home appliance to be controlled.

In some implementations, the remote controller may be a software module of the command input device 200 configured to control the home appliance to be controlled (i.e., a target home appliance). For example, the remote controller may be a graphical representation displayed on the display of the command input device 200.

Further, the controller 210 may output a control signal for activating a remote controller, which controls the home appliance to be controlled, to a mobile terminal that is connected to the command input device 200 through wireless communications.

In order to activate the remote controller, the controller 210 may control a mobile terminal 300 or the command input device 200 to execute the management application 270 of the home appliance 700, or may control the mobile terminal 300 or the command input device 200 to download the management application 270 from a server 10 and to execute the downloaded management application 270

The controller 210 may display a current state and a type of the home appliance to be controller on the activated remote controller or remote object.

The controller 210 may generate a control signal for controlling the home appliance based on a user's control command input from the input module 260, the management application 270, the remote controller, and the remote object. The controller 210 may control the generated control signal to be transmitted through the communication module 230 to the home appliance to be controlled.

In addition, once the contact between the home appliance to be controlled and the command input device 200 is released, the controller 210 outputs a control signal for changing the operation mode of the command input device 200 to a standby mode. Here, the standby mode of the command input device 200 includes deactivation of the remote controller activated in the display 240, or turning off the display 240. Furthermore, once the contact between the home appliance to be controlled and the command input device 200 is released, the controller 210 may stop power transmission of the home appliance 700 by outputting a control signal for stopping power transmission to the command input device 200.

Hereinafter, a configuration of the command input device 200 will be described in detail.

Figure 3:
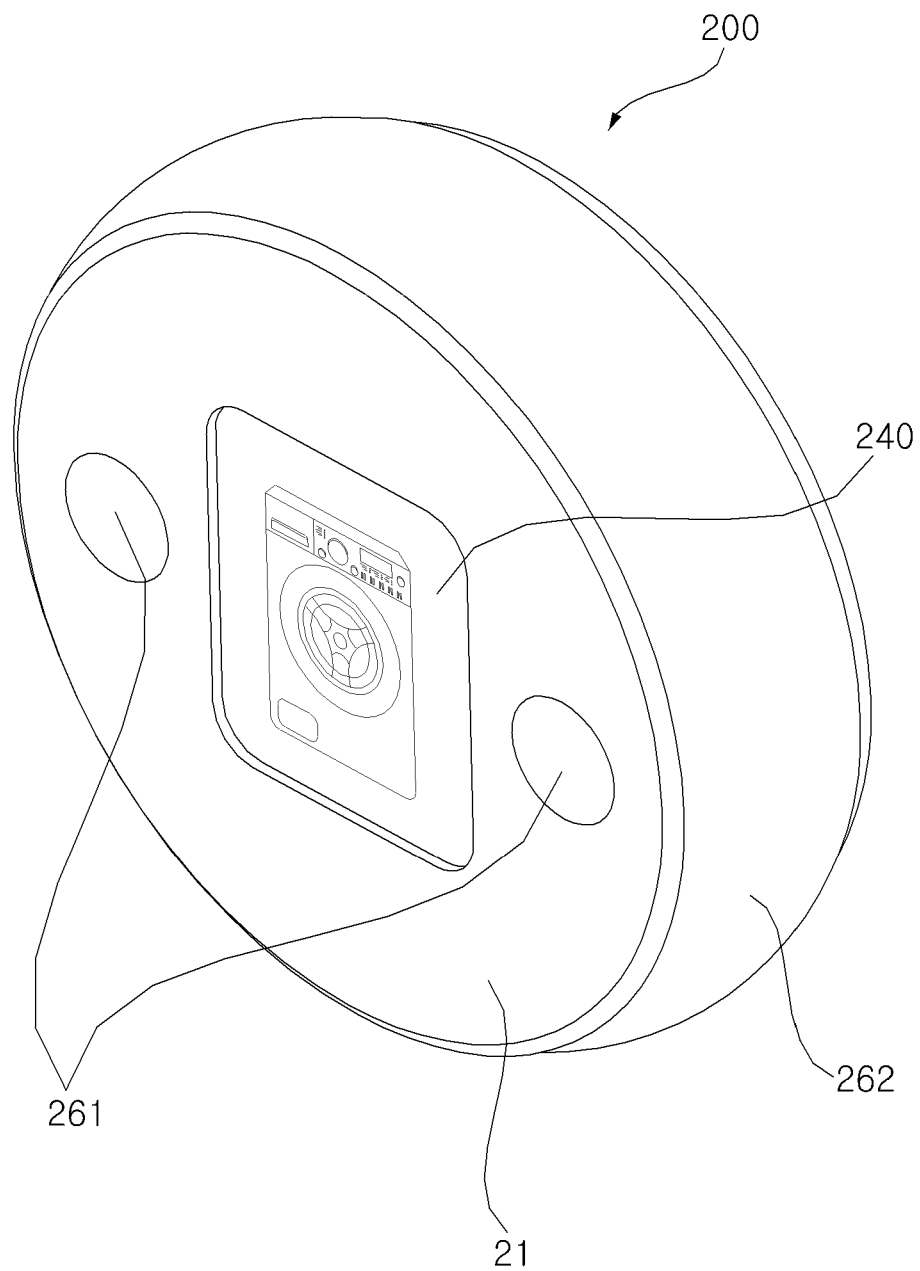
FIG. 3 is a perspective view of an example command input device.
Figure 4:
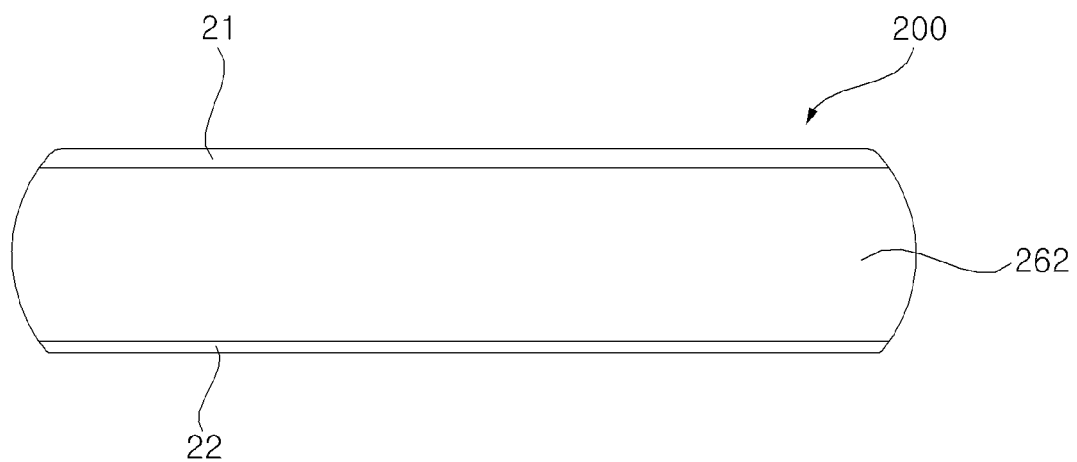
FIG. 4 is a side view of the command input device illustrated in FIG. 3.
Figure 6:
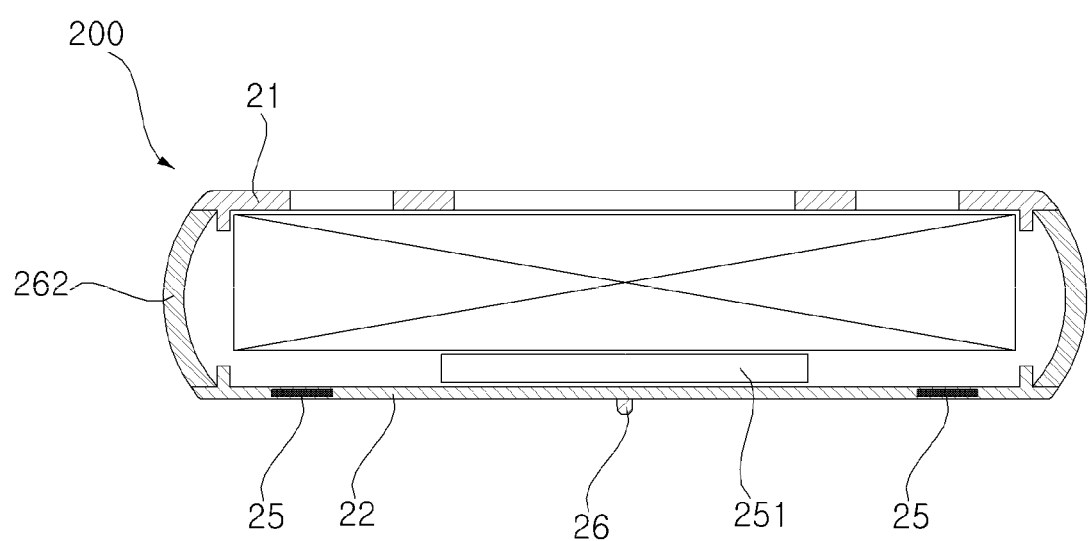
FIG. 6 is a cross-sectional view of the command input device illustrated in FIG. 3.
Figure 7:
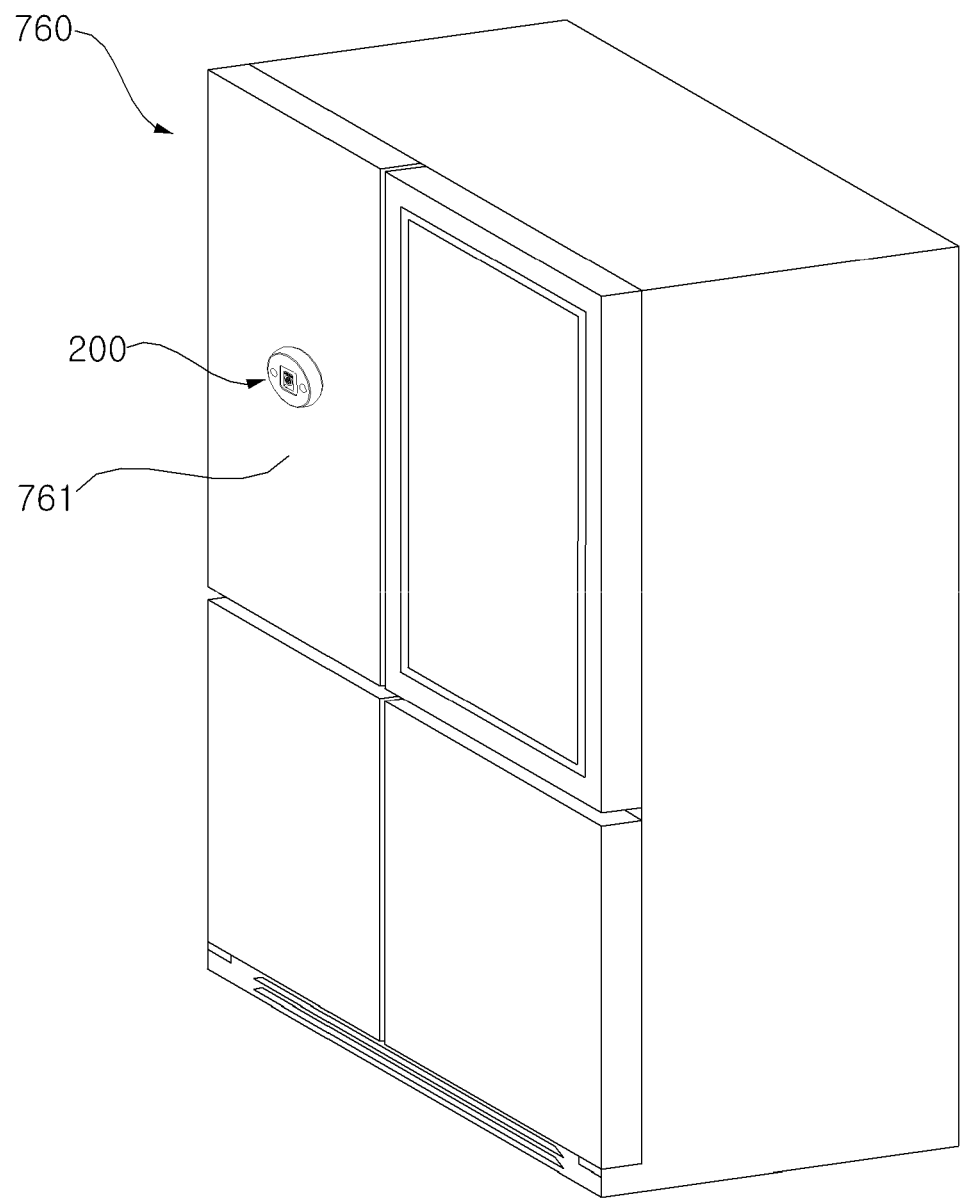
FIG. 7 is a diagram of an example command input device attached to an example home appliance.
Figure 8:
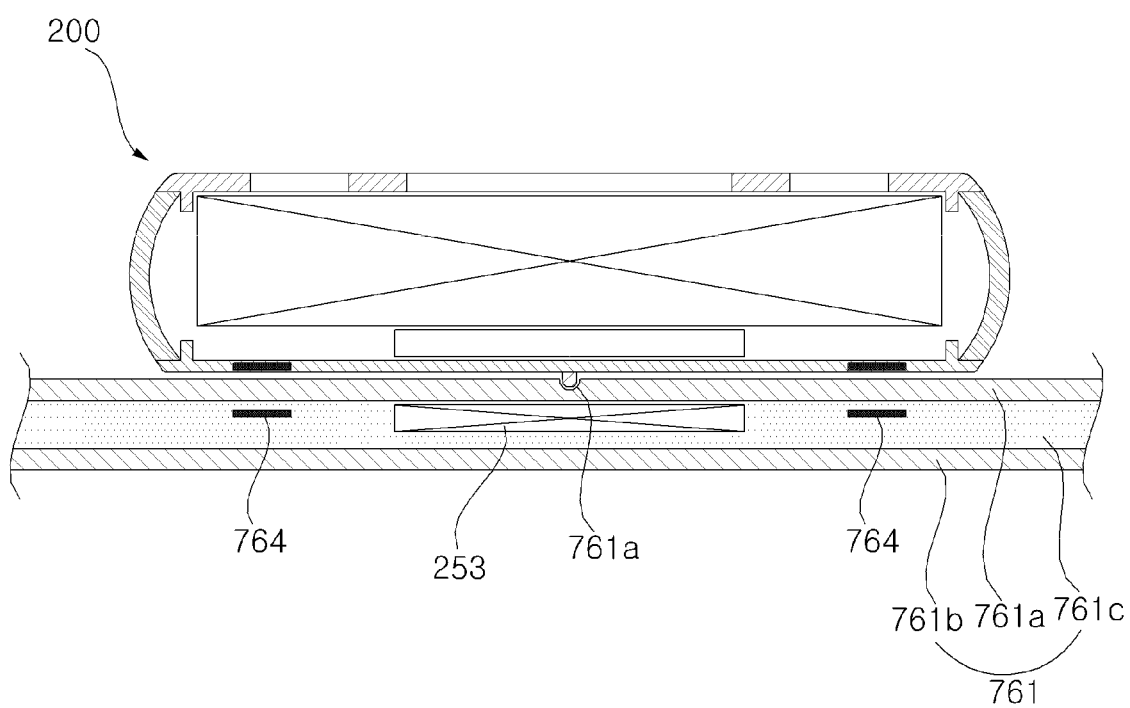
FIG. 8 is a cross-sectional view of one surface of the command input device attached to the home appliance illustrated in FIG. 7.

FIG. 3 is a perspective view of the command input device 200; FIG. 4 is a side view of the command input device 200 illustrated in FIG. 3; FIG. 5 is an exploded perspective view of the command input device 200 illustrated in FIG. 3; FIG. 6 is a cross-sectional view of the command input device 200 illustrated in FIG. 3; FIG. 7 is a diagram of the command input device 200 attached to the home appliance 700; and FIG. 8 is a cross-sectional view of one surface of the command input device 200 attached to the home appliance 700 illustrated in FIG. 7.

The command input device 200 may further include housings 21 and 22, and a magnetic body 25.

The housings 21 and 22 may accommodate or include any one of a display 240, a power receiving module 250, a communication module 230, or an input module 260.

For example, the housings 21 and 22 accommodate a display 370 while exposing one side of the display 370 (specifically top side). The housings 21 and 22 may be integrally formed or may be formed to include a plurality of components which are connected with each other. In some examples, the housings 21 and 22 include a plurality of components in consideration of the convenience of assembly or a degree of autonomy of arrangement of components.

For example, the housings 21 and 22 may include an upper housing 21 and a lower housing 22. The upper housing 21 has a window 21*a* for exposing the display 240, and a button hole 21*b* for exposing a physical button 261 included in the input module 260. The lower housing 22 may be connected to the upper housing 21 to form an accommodation space therein, and a dial 262, as one component of the input module 260, is rotatably connected to an outer surface of the lower housing 22. The lower housing 22 may include a rotation sensing module 263 to sense a rotation direction of the dial 262.

In this case, the input module 260 includes: the dial 262 which is connected to the housings 21 and 22 to rotate around a rotating shaft of the housings 21 and 22; and the physical button 261 which is exposed through the upper housing 21.

The power receiving module 250 includes a reception coil 251 which generates power by electromagnetic induction using a magnetic field generated by transmission coil 253. The reception coil 251 is disposed above the lower housing 22. In some examples, the reception coil 251 is disposed at the center of the lower housing 22.

The housings 21 and 22 may further include a magnetic body 25. The magnetic body 25 generates an attractive force with respect to the casing 761 of the home appliance 700 to allow for easy alignment of the command input device 200, and generates a magnetic force to allow the command input device 200 to be attached to the surface of the home appliance 700.

The magnetic body 25 is a material having a magnetic force. For example, the magnetic body 25 includes a magnet, which is either a permanent magnet or a temporary magnet.

The magnetic body 25 is disposed eccentrically from the center of the lower housing 22 by considering arrangement with reception coil 251.

In this case, a reaction body 764, to which an attractive force is applied by the magnetic body 25, is included in the casing 761 of the home appliance 700. Even when the command input device 200 is moved, the magnetic force between the reaction body 764 and the magnetic body 25 provides a restoring force to allow the command input device 200 to return to its original position. Further, the magnetic force between the reaction body 764 and the magnetic body 25 allows for easy alignment of the command input device 200 with the magnetic body 25 of the home appliance to be controlled. The housings 21 and 22 may be aligned to an original position on the home appliance to be controlled, by the attractive force between the magnetic body 25 and the reaction body 764.

The reaction body 764 is installed in the casing 761. For example, the reaction body 764 includes a magnet which generates an attractive force with respect to the magnetic body 25. Specifically, the magnetic body 25 may be a magnet having a first polarity, and the reaction body 764 may be a magnet having a second polarity which is opposite to the first polarity.

In another example, the magnetic body 25 may be a magnet, and the reaction body 764 may include a magnetic metal, to which an attractive force is applied by the magnetic body 25. The magnetic metal is a metal including a magnetic material, to which an attractive force is applied by a magnetic force of the magnet. The magnetic metal includes a ferromagnetic body. Specifically, the reaction body 764 may be any one element among Ni, Cr, Mo, and Fe, or may be an alloy of these elements.

That is, the magnetic body 25 of the command input device 200 is aligned and fixed by a magnetic force of the casing 761 itself of the home appliance 700, or by a magnetic force between the magnetic body 25 and the reaction body 764 installed in the casing 761 of the home appliance 700.

The housings 21 and 22 may further include a position determiner 26 which determines an alignment position of the home appliance to be controlled and the housings 21 and 22. The position determiner 26 may be an alignment protrusion, which protrudes from the lower housing 22, or an alignment groove which is formed by recessing the lower housing 22.

In another example, the position determiner 26 may be a magnet which generates an attractive force with respect to the magnet disposed at the housings 21 and 22. In yet another example, the position determiner 26 may be a protruding portion having a shape corresponding to various shapes of a groove formed at the housings 21 and 22. The casing 761 of the home appliance 700, which is a single member, may be made of a metal. In some examples, the casing 761 is made of an insulation body so as not to interrupt wireless power transmission.

In some implementations, the casing 761 of the home appliance 700 includes an upper casing 761a, a lower casing 761b which is spaced apart from the upper casing 761a while facing the upper casing 761a, and an insulation member 761c which is interposed between the upper casing 761a and the lower casing 761b.

The transmission coil 253, as one component of the power transmission module, may be interposed between the upper casing 761a and the lower casing 761b. The reaction body 764 may be interposed between the upper casing 761a and the lower casing 761b.

A receiving groove, which is connected to the position determiner 26 of the command input device 200, may be formed at the upper casing 761a.

FIG. 9 is a conceptual diagram of an example home appliance system.

Referring to FIG. 9, the home appliance system is configured in such a manner that the home appliance 700 and the command input device 200 are electrically connected to each other to transmit electric power.

In some implementations, receiving electrodes 251a and 251b are disposed in the lower housing 22 of the command input device 200, and receiving electrodes 253a and 253b are disposed in the casing 761 of the home appliance 700. The receiving electrodes 251a and 251b and the receiving electrodes 253a and 253b come into contact with each other to transmit electric power.

A plurality of receiving electrodes 253a and 253b are disposed to face each other. The number and shape of the receiving electrodes 251a and 251b correspond to the number and shape of the receiving electrodes 253a and 253b.

FIG. 10 is a conceptual diagram of another example home appliance system.

Referring to FIG. 10, the home appliance system includes receiving electrodes 251a and 251b and receiving electrodes 253a and 253b, which have different shapes from those of FIG. 9.

Any one of the receiving electrodes 251a or 251b is disposed to surround the other. The number and shape of the receiving electrodes 251a and 251b correspond to the number and shape of the receiving electrodes 253a and 253b.

Figure 11:
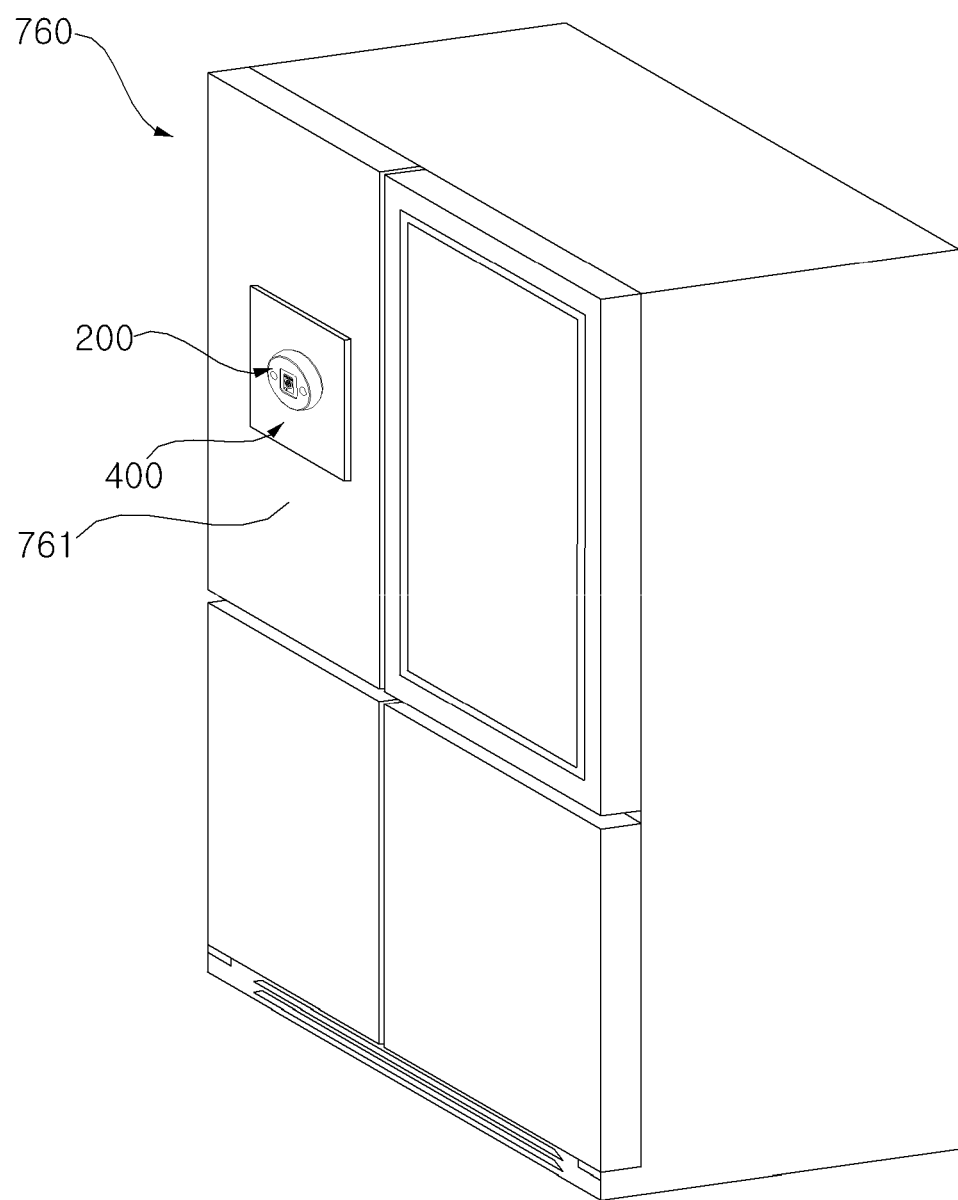
FIG. 11 is a diagram of an example command input device attached to an example home appliance.
Figure 12:
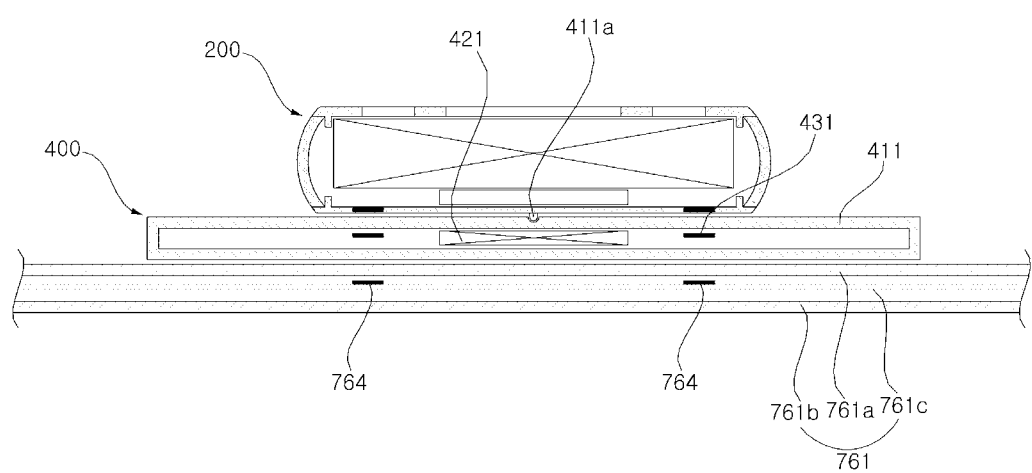
FIG. 12 is a cross-sectional view of one surface of an example command input device attached to an example home appliance.

FIG. 11 is a diagram of an example command input device attached to another example home appliance; and FIG. 12 is a cross-sectional view of one surface of an example command input device attached to a home appliance.

Referring to FIGS. 11 and 12, the command input device 200 may not directly contact the home appliance 700, but may be connected to the home appliance 700 through a separate connection module 400. When it is determined whether the aforementioned command input device 200 is in contact with the home appliance 700, the connection module 400 is assumed to be one surface of the home appliance 700. That is, specifically, based on pressure measured by a pressure sensor, in the case where one surface of the home appliance 700 and one surface of the command input device 200 approach each other to within a close distance, or in the case where the home appliance 700 and the command input device 200 are electrically connected to each other, the controller 210 may determine that the home appliance 700 and the command input device 200 are in contact with each other.

The connection module 400 is detachably connected to one surface of the home appliance 700, and the command input device 200 is detachably connected to one surface of the connection module 400. By using the connection module 400, a home appliance having no transmission coil may also use the command input device 200.

For example, the connection module 400 includes a transmission coil 421 for transmitting power to the command input device 200, and a case 411 for accommodating the transmission coil 421. In one implementation, the case 411 may include a battery to provide power to the transmission coil 421. In another implementation, the transmission coil 421 may be connected to an external power source through a connector of the connection module 400.

In the case where the connection module 400 includes a battery or is driven by an external power source, it is effective in that the home appliance 700 does not require a separate structure for receiving power, and there is no need to use a battery in the command input device 200, thereby reducing the size of the command input device 200.

The connection module 400 may be attached to the home appliance 700 by hook coupling, by a magnetic force, or by negative pressure. In the implementation, the connection module 400 is attached by a magnet 431, but the attachment is not limited thereto.

In some examples, the connection module 400 is attached to the command input device 200 by a magnetic force of the magnet.

Figure 13:
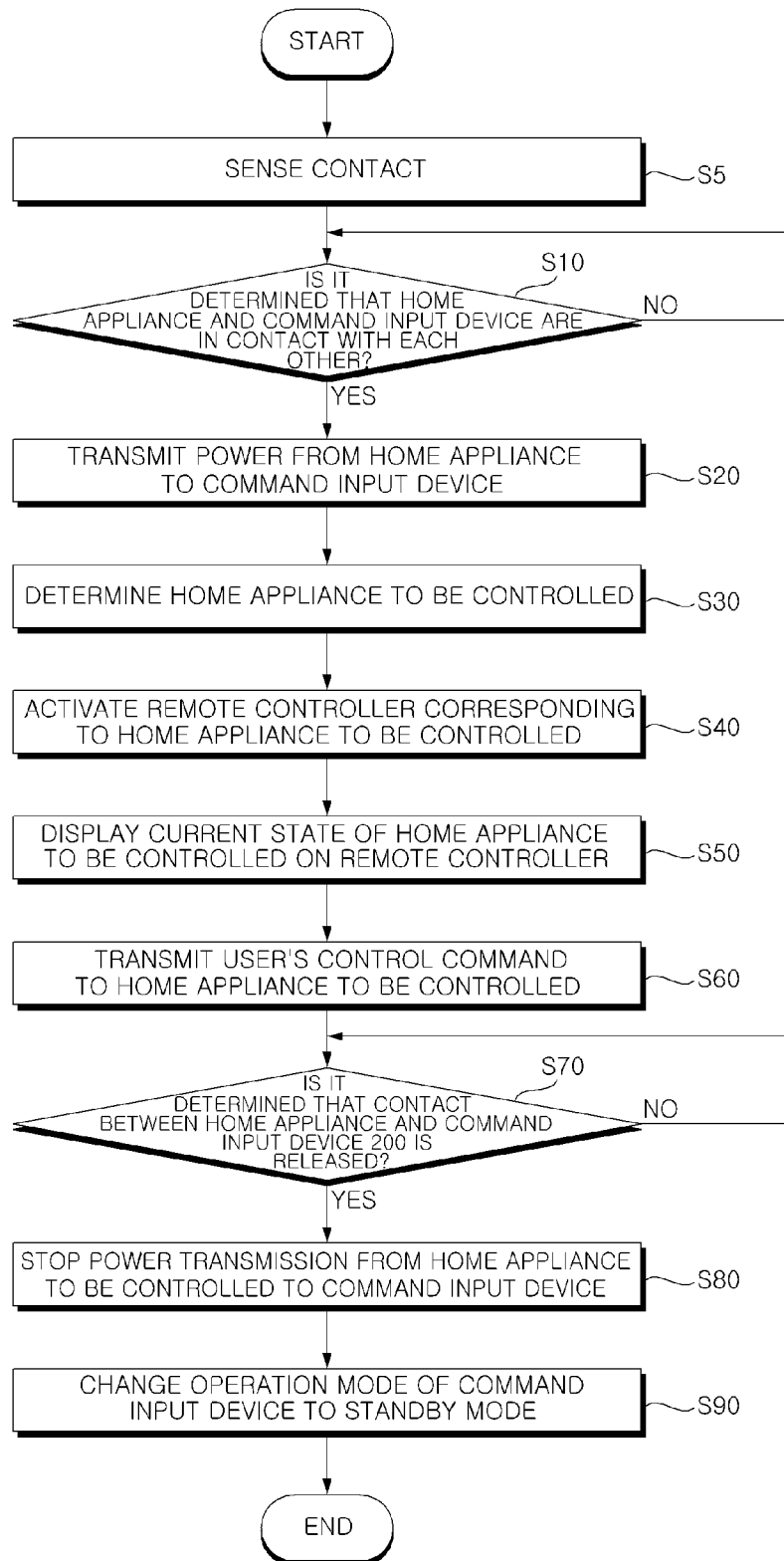
FIG. 13 is a flowchart illustrating an example controlling method of a command input device.

FIG. 13 is a flowchart illustrating an example controlling method of the command input device 200.

Referring to FIG. 13, the method of controlling the command input device 200 includes: sensing contact between the home appliance 700 and the command input device 200; upon sensing that the home appliance 700 and the command input device 200 come into contact with each other, determining the contacted home appliance 700 to be a home appliance to be controlled; and activating a remote controller, corresponding to the determined home appliance to be controlled, in the command input device 200.

In addition, the determining of the home appliance to be controlled may further include, upon sensing that the home appliance 700 and the command input device 200 come into contact with each other, transmitting power wirelessly from the contacted home appliance 700 to the command input device 200.

The method of controlling the command input device 200: displaying a type and a current state of the home appliance 700 on the remote controller which is activated in the command input device 200; transmitting a user's control command, which is input through the remote controller activated in the command input device 200, to the home appliance to be controlled; determining whether the contact between the home appliance 700 and the command input device 200 is released; upon determining that the contact between the home appliance 700 and the command input device 200 is released, stopping the power transmission; and changing an operation mode of the command input device 200 to a standby mode.

First, the controller 210 controls the contact sensing module 290 to sense the contact between the home appliance 700 and the command input device 200 in S5. Specifically, the controller 210 outputs a control signal to the above-described various sensors to measure a distance between the home appliance 700 and the contact command input device 200.

Then, the controller 210 determines whether the home appliance 700 and the command input device 200 are in contact with each other, based on sensing results obtained by the contact sensing module 290 in S10. Specifically, based on pressure measured by a pressure sensor, in the case where one surface of the home appliance 700 and one surface of the command input device 200 approach each other to within a close distance, and in the case where the home appliance 700 and the command input device 200 are electrically connected to each other, the controller 210 determines that the home appliance 700 and the command input device 200 are in contact with each other in S10. The controller 210 maintains the command input device 200 in a standby mode or a sleep mode until the home appliance 700 and the command input device 200 come into contact with each other.

Subsequently, upon sensing that the home appliance 700 and the command input device 200 are in contact with each other, the controller 210 controls power transmission from the home appliance 700 to the command input device 200 in S20. Specifically, the controller 210 outputs a control signal to apply power to the transmission coils 421 and 253 of the home appliance 700.

Next, the controller 210 determines the contacted home appliance 700 to be a home appliance to be controlled in S30. Specifically, upon sensing that the command input device 200 comes into contact with the home appliance 700, the controller 210 may control the home appliance 700, which is in contact with the command input device 200, to transmit an identification code, and may control the command input device 200, which is in contact with the home appliance 700, to receive the identification code. By contrast, upon sensing that the command input device 200 comes into contact with the home appliance 700, the controller 210 may control the command input device 200, which is in contact with the home appliance 700, to transmit an identification code, and may control the home appliance 700, which is in contact with the command input device 200, to receive the identification code. Upon determining that the home appliance 700 and the command input device 200 are in contact with each other, the controller 210 determines a home appliance to be controlled by controlling either one of the contacted home appliance 700 or command input device 200 to transmit the identification code, and by controlling either one of the contacted home appliance 700 or command input device 200 to transmit the identification code.

Then, the controller 210 activates a remote controller, corresponding to the determined home appliance to be controlled, in the command input device 200 in S40. In the activating of the remote controller, the controller 210 may output a remote object, which controls the home appliance to be controlled, to the display 240 of the command input device 200, or may activate the remote controller, which controls the home appliance to be controller, in a mobile terminal connected to the command input device 200 through wireless communications; or the command input device 200 may execute a management application of the home appliance to be controlled, or may download the management application of the home appliance to be controlled from the server, and may execute the downloaded management application.

Subsequently, the controller 210 displays a type and a current state of the home appliance 700 on the remote controller which is activated in the command input device 200 in S50. For example, in the case where the home appliance is a refrigerator, the controller 210 may display internal temperature and an operation mode of the refrigerator, and the like, through the remote controller which is activated in the command input device 200.

Next, the controller 210 may transmit a user's control command, which is input through the remote controller activated in the command input device 200, to the home appliance to be controlled in S60.

Then, the controller 210 determines whether the contact between the home appliance 700 and the command input device 200 is released in S70. Specifically, based on pressure measured by a pressure sensor, in the case where one surface of the home appliance 700 and one surface of the command input device 200 are separated further away from each other than a predetermined distance, and in the case where the home appliance 700 and the command input device 200 are not electrically connected to each other, the controller 210 determines that contact between the home appliance 700 and the command input device 200 is released.

Subsequently, upon determining that the contact between the home appliance to be controlled and the command input device 200 is released, the controller 210 controls the home appliance to be controlled to stop power transmission in S80. Specifically, the controller 210 outputs a control signal for disconnecting power to the transmission coil 253 of the home appliance 700.

Next, the controller 210 changes the operation mode of the command input device 200 to a standby mode in S90.

According to the command input device and a method of controlling the same of the present disclosure, one or more of the following effects may be produced.

First, by providing a power receiving module, it is effective in that the size of the power supply unit of the command input device may be reduced, there is no need to separately charge the command input device, and production costs of the command input device may be reduced.

Secondly, a single command input device may perform fine control of a plurality of home appliances, such that the command input device may be shared among home appliances.

Thirdly, when the command input device is not in contact with a home appliance, the command input device is maintained in a standby mode or a sleep mode, thereby reducing energy consumption when the command input device is not in use.

Fourthly, a user may control a home appliance by simply attaching the command input device to the home appliance without need for separate pairing, such that user convenience may be improved.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, content related to these combinations and modifications should be construed as including in the scope and spirit of the disclosure as disclosed in the accompanying claims.

What is claimed is:

1. A method for controlling a command input device, the method comprising:
    sensing contact between a home appliance and the command input device;
    based on sensing the contact between the home appliance and the command input device, determining the home appliance as a target home appliance to be controlled by the command input device;
    based on the determination of the home appliance as the target home appliance to be controlled by the command input device, activating a remote controller provided by the command input device and configured to control the target home appliance; and
    based on sensing the contact between the home appliance and the command input device, transmitting power wirelessly from the target home appliance to the command inpu t device,
    wherein activating the remote controller comprises outputting, to a display of the command input device, an object that represents the remote controller for controlling the target home appliance,
    wherein the command input device is configured to connect to a mobile terminal through wireless communication, and
    wherein activating the remote controller comprises outputting, to the mobile terminal, a control signal for activating the remote controller.

2. The method of claim 1, further comprising:
    determining whether the contact between the home appliance and the command input device is released; and
    based on a determination that the contact between the home appliance and the command input device is released, stopping transmission of power from the target home appliance to the command input device.

3. The method of claim 1, further comprising:
    receiving a control command that is input from a user through the remote controller; and
    transmitting the control command to the target home appliance.

4. The method of claim 1, wherein activating the remote controller comprises executing, by the command input device, a management application of the target home appliance.

5. The method of claim 1, wherein activating the remote controller comprises:
    downloading, from a server to the command input device, a management application of the target home appliance; and
    executing the management application by the command input device.

6. The method of claim 1, wherein sensing the contact between the home appliance and the command input device comprises sensing contact between a surface of a casing of the home appliance and the command input device.

7. A command input device, comprising:
    a contact sensing module configured to sense contact between a home appliance and the command input device;
    a communication module configured to transmit data to the home appliance and to receive data from the home appliance;
    a display configured to output an object representing a remote controller that is provided by the command input device and that is configured to control the home appliance;
    an input module configured to receive, from a user, a control command for controlling the home appliance; and
    a controller configured to control operation of the command input device, wherein the controller is further configured to:
        based on the contact sensing module sensing the contact between the home appliance and the command input device, determine the home appliance as a target home appliance to be controlled by the command input device,
        based on the determination of the home appliance as the target home appliance to be controlled by the command input device, output, to the display, a control signal for activating the remote controller,
        based on the contact between the target home appliance and the command input device, output a first control signal for transmitting power from the home appliance to the command input device, and
        based on a release of the contact between the target home appliance and the command input device, output a second control signal for stopping transmission of power from the home appliance to the command input device, wherein the controller is further configured to activate the remote controller based on outputting, to a display of the command input device, an object that represents the remote controller for controlling the target home appliance, wherein the command input device is configured to connect to a mobile terminal through wireless communication, and wherein the controller is further configured to activate the remote controller based on outputting, to the mobile terminal, a control signal for activating the remote controller.

8. The command input device of claim 7, wherein the input module comprises a touch screen located at the display and configured to receive touch input from the user.

9. The command input device of claim 7, wherein the controller is further configured to, based on a release of the contact between the target home appliance and the command input device, turn off the display.

10. The command input device of claim 7, further comprising:
a housing configured to accommodate the display, the input module, and the communication module; and
a magnetic body located in the housing and configured to generate attractive force to a casing of the home appliance.

11. The command input device of claim 10, wherein the input module comprises a physical button exposed through a surface of the housing.

12. The command input device of claim 10, wherein the housing comprises a position determiner configured to assist placement of the command input device at an alignment position of the target home appliance.

13. The command input device of claim 10, wherein the input module comprises:
a dial connected to the housing and configured to rotate about a rotating shaft of the housing; and
a rotation sensing module configured to sense a rotation direction of the dial.

14. The command input device of claim 8, further comprising a power receiving module configured to receive power transmitted from the target home appliance.

15. The command input device of claim 7, wherein the controller is further configured to transmit, to the target home appliance, the control command that is input from the user through the input module.

16. The command input device of claim 7, wherein the controller is further configured to, based on a release of the contact between the target home appliance and the command input device, output, to the display, a control signal for deactivating the remote controller.

* * * * *